United States Patent
Schlipf

(10) Patent No.: US 8,398,019 B2
(45) Date of Patent: Mar. 19, 2013

(54) ADJUSTING DEVICE FOR ADJUSTING A HIGH-LIFT FLAP AND AIRFOIL WING COMPRISING SUCH AN ADJUSTING DEVICE

(75) Inventor: Bernhard Schlipf, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 817 days.

(21) Appl. No.: 12/306,855

(22) PCT Filed: Jul. 2, 2007

(86) PCT No.: PCT/IB2007/052566
§ 371 (c)(1),
(2), (4) Date: Feb. 2, 2009

(87) PCT Pub. No.: WO2008/001336
PCT Pub. Date: Jan. 3, 2008

(65) Prior Publication Data
US 2009/0272843 A1    Nov. 5, 2009

(30) Foreign Application Priority Data
Jun. 30, 2006   (DE) .................. 10 2006 030 315

(51) Int. Cl.
*B64C 13/00*    (2006.01)
(52) U.S. Cl. .................. 244/99.2; 244/99.3; 244/213
(58) Field of Classification Search .................. 244/90, 244/99.2, 99.3, 213–215 R
See application file for complete search history.

(56) References Cited

U.S. PATENT DOCUMENTS

| | | | |
|---|---|---|---|
| 2,624,532 A | 1/1953 | Butler | |
| 3,140,066 A | 7/1964 | Sutton et al. | |
| 6,375,126 B1 * | 4/2002 | Sakurai et al. | 244/214 |
| 6,382,566 B1 * | 5/2002 | Ferrel et al. | 244/215 |
| 6,464,176 B2 * | 10/2002 | Uchida et al. | 244/216 |
| 6,804,586 B2 * | 10/2004 | Richter et al. | 701/3 |
| 6,824,099 B1 | 11/2004 | Jones | |
| 7,243,881 B2 * | 7/2007 | Sakurai et al. | 244/212 |

(Continued)

FOREIGN PATENT DOCUMENTS

| | | |
|---|---|---|
| DE | 40 05 235 | 9/1990 |
| DE | 43 34 680 | 4/1995 |

(Continued)

OTHER PUBLICATIONS

German Office Action conducted in counterpart German Appln. No. 10 2006 030 315.6-22 (Jul. 3, 2007).

(Continued)

*Primary Examiner* — Christopher P Ellis
(74) *Attorney, Agent, or Firm* — Greenblum & Bernstein, P.L.C.

(57) ABSTRACT

An adjusting device for adjusting a flap at an wing of an aircraft includes at least one flap drive for operating the flap and a plurality of drive stations comprising drive struts structured and arranged to movably connect the flap to the wing. The plurality of drive stations includes at least two first drive stations that guide the flap in a defined position in a wing chord direction. The plurality of drive stations includes at least one second drive station at which the flap is moveable in the wing chord direction. The at least one second drive station includes at least one compensation element structured and arranged to compensate constraining forces occurring in the plurality of drive stations due to relative movements between the flap and the wing in the wing chord direction.

21 Claims, 2 Drawing Sheets

U.S. PATENT DOCUMENTS

| | | | |
|---|---|---|---|
| 7,270,305 B2 * | 9/2007 | Rampton et al. | 244/214 |
| 7,607,611 B2 * | 10/2009 | Wingett et al. | 244/99.3 |
| 8,038,103 B2 * | 10/2011 | Lacy et al. | 244/211 |
| 2002/0005461 A1 | 1/2002 | Nettle et al. | |
| 2002/0047068 A1 | 4/2002 | Uchida et al. | |
| 2005/0011994 A1 * | 1/2005 | Sakurai et al. | 244/212 |
| 2006/0226297 A1 * | 10/2006 | Perez-Sanchez | 244/216 |
| 2008/0191089 A1 * | 8/2008 | Reckslek et al. | 244/99.3 |
| 2008/0203223 A1 * | 8/2008 | Cyrot et al. | 244/99.3 |
| 2008/0265090 A1 * | 10/2008 | Schievelbusch | 244/99.3 |
| 2009/0072093 A1 * | 3/2009 | Fox et al. | 244/214 |

FOREIGN PATENT DOCUMENTS

| | | |
|---|---|---|
| DE | 103 53 672 | 6/2005 |
| EP | 0 141 609 | 5/1985 |
| EP | 0 818 387 | 1/1998 |
| GB | 489 618 | 7/1938 |
| GB | 2 277 305 | 10/1994 |
| GB | 2 277 305 A | 10/1994 |
| RU | 2 026 240 | 1/1995 |
| RU | 2 046 057 | 10/1995 |
| RU | 1 001 607 | 12/2004 |
| SU | 1 285 708 | 12/1991 |
| SU | 1 001 607 | 12/2004 |

OTHER PUBLICATIONS

Translation of Russian Office Action conducted in counterpart Russian Appln. No. 2009 102 946 (no date provided).

* cited by examiner

ADJUSTING DEVICE FOR ADJUSTING A HIGH-LIFT FLAP AND AIRFOIL WING COMPRISING SUCH AN ADJUSTING DEVICE

CROSS-REFERENCE TO RELATED APPLICATIONS

The present application is a U.S. National Stage of International Patent Application No. PCT/IB2007/052566 filed Jul. 2, 2007, and claims priority of German Patent Application No. 10 2006 030 315.6 filed Jun. 30, 2006. Moreover, the disclosure of International Patent Application No. PCT/IB2007/052566 is expressly incorporated by reference herein in its entirety.

BACKGROUND OF THE INVENTION

1. Field of the Invention

The invention relates to an adjusting device for adjusting a high-lift flap at the airfoil wing of an aircraft, and to an airfoil wing comprising such an adjusting device.

2. Discussion of Background Information

In known high-lift systems of modern airliners and transport planes, and in particular in those having a high take-off weight, high-lift flaps provided at the wing trailing edge are movably connected to the airfoil wing by several driving stations. For operating the flap, drive links are used which comprise tension/compression elements (drive struts) connected for example via a torsion shaft to a flap drive which is typically disposed centrally. The tension/compression elements are coupled with lever arms provided at the torsion shaft and are linked with the flap in the area of the drive stations by load leading mountings. A disadvantage of this solution is that constraining forces may occur due to relative movements between flap and wing in high-lift flaps which are connected to the airfoil wing by more than two drive stations.

It is known from general prior art to attach the tension/compression elements to a main girder which acts on the flap by pendulum supports. In this regard, it is a disadvantage that there may occur an undesired force coupling between the normal force acting on the flap and the drive force depending on the relative displacement of the main girder due to the pendulum supports. In addition, such high-lift systems have a high weight and involve high manufacturing and mounting costs due to the required components (main girder, pendulum supports, bearings, etc.) and the complexity of the system.

SUMMARY OF THE INVENTION

In accordance with aspects of the invention, there is an improved adjusting device for adjusting a high-lift flap and an airfoil wing provided with such an adjusting device, wherein constraining forces are avoided or minimized, with minimum time and effort concerning the production.

In embodiments, there is an adjusting device for adjusting a high-lift flap at the airfoil wing of an aircraft, comprising at least one flap drive for operating the flap and several drive stations comprising tension and compression forces transmitting devices for movably connecting the high-lift flap to the airfoil wing. The high-lift flap is connected to the airfoil wing via at least three drive stations, including at least two first drive stations at which the flap is guided in a defined position with regard to the wing chord direction. At least one second drive station comprises at least one compensation element at which the flap is movable with regard to the wing chord direction for compensation of relative movements between the flap and the wing for compensation of constraining forces occurring in the drive stations due to relative movements in the direction of the wing chord between the flap and the wing. In additional embodiments, there is an airfoil wing of an aircraft comprising at least one adjusting device as described herein.

The adjusting device for adjusting a high-lift flap at the airfoil wing of an aircraft according to aspects of the invention comprises at least one flap drive for operating the flap and several drive stations, which movably connect the high-lift flap to the airfoil wing for guiding the flap by tension/compression elements. The flap drive is connected to several drive stations for adjusting the high-lift flap. According to aspects of the invention, at least one compensation element for compensation of constraining forces which are due to relative movements in the wing chord direction between flap and wing and which occur in the drive links comprising the tension/compression elements is assigned to at least one drive station. Due to the at least one compensation element in the drive links comprising the tension/compression elements, constraining forces are avoided in the flap and in the drive train, such that in comparison with general prior art systems, no additional components (main girder, pendulum supports, bearings, etc.) are required for compensation of the changes of length. Accordingly, the flap normal force is decoupled from the drive force. The adjusting device according to the invention as well as an airfoil wing provided with such an adjusting device has a light weight and can be manufactured easily and in a cost-effective manner.

In embodiments, the compensation element is preferably disposed in the drive link comprising the tension/compression element between a torsion shaft connected to the flap drive and the flap.

According to an embodiment of the invention, the compensation element is provided at least in sections to be elastic. A consistent load of the tension/compression elements is achieved by a suitable choice of the stiffness of the elastic compensation element.

According to an embodiment of the invention, first and second drive stations are provided. The high-lift flap is held in a defined position with respect to the wing chord direction at the first drive stations and is movable with respect to the wing chord direction for compensation of relative movements between flap and wing at the second drive stations. The compensation element inserted in the drive link comprising the tension/compression element is provided in the second drive station.

According to an embodiment, the high-lift flap is movably adjustably connected to the airfoil wing by three drive stations, including two first drive stations at which the flap is held in a defined position with regard to the wing chord direction and a second drive station at which the flap is movable for compensation of relative movements between flap and wing with regard to the wing chord direction. The compensation element inserted in the drive link comprising the tension/compression element is provided in the second drive station.

The compensation element may be provided at the tension/compression element or it may be formed by the same.

The compensation element may be provided between the tension/compression element and the flap.

The compensation element may be provided between the tension/compression element and at least one lever arm assigned to the drive link.

The compensation element may be provided at the lever arm element or may be formed by the same. The lever arm element may be formed to be elastic.

The compensation element may be provided between the torsion shaft and the lever arm element.

The compensation element may be linearly elastic.

The compensation element may be torsion elastic.

The compensation element may be formed by at least one spring.

The compensation element may comprise at least one elastomer element.

According to an embodiment, at least one limit stop is provided at the compensation element, limiting the admissible relative movement. Thereby, a functioning in cases of failure is assured.

According to an embodiment of the invention, the compensation element has a stiffness which is highly progressive in the compression direction.

According to an embodiment of the invention, at least one damping element may be provided for damping vibrations of the compensation element. The damping element may be formed passively or actively in this regard. The damping effect may be achieved, for example, by a spring element having a corresponding spring characteristic.

According to an embodiment of the invention, at least one sensor element may be provided for detecting relative movements, in particular inadmissibly large relative movements in the drive link comprising the tension/compression element.

The sensor element may be connected in parallel to the elastic element.

The adjusting device may be provided at the leading edge of an airfoil wing.

According to a preferred embodiment of the invention, the high-lift flap is provided at the trailing edge of the airfoil wing of an aircraft.

An airfoil wing of an aircraft according to the invention is provided with at least one adjusting device of that type for adjusting a high-lift flap.

In accordance with aspects of the invention, there is an adjusting device for adjusting a flap at a wing of an aircraft including at least one flap drive for operating the flap, and a plurality of drive stations comprising drive struts structured and arranged to movably connect the flap to the wing. The plurality of drive stations includes at least two first drive stations that guide the flap in a defined position in a wing chord direction. The plurality of drive stations includes at least one second drive station at which the flap is moveable in the wing chord direction. The at least one second drive station includes at least one compensation element structured and arranged to compensate constraining forces occurring in the plurality of drive stations due to relative movements between the flap and the wing in the wing chord direction.

The at least one compensation element may be arranged in the drive strut of the at least one second drive station between the flap and a torsion shaft connected to the flap drive. The at least one compensation element may be elastic at least in sections.

In embodiments, the flap is a high-lift flap and the at least two first drive stations hold the flap in a defined position in the wing chord direction via dropped-hinged kinematics. In further embodiments, the flap is a high-lift flap, the wing is an airfoil wing, and the flap is connected to the wing by a track-rear link arrangement.

The at least one compensation element may be provided at or formed by the drive strut of the at least one second drive station. The at least one compensation element may be provided between the flap and the drive strut of the at least one second drive station.

In embodiments, the at least one compensation element is provided between the drive strut of the at least one second drive station and a lever arm operatively connected to the drive strut, and the lever arm and the drive strut are included in a drive link.

In accordance with aspects of the invention, a drive link includes the drive strut of the at least one second drive station and a lever arm operatively connected to the drive strut. The at least one compensation element may be provided at or formed by the lever arm. The at least one compensation element may be provided between the lever arm and a torsion shaft of the flap drive.

The at least one compensation element may be linearly elastic. The at least one compensation element may be torsion elastic. The at least one compensation element may include at least one spring. The at least one compensation element may include at least one elastomer element.

In embodiments, the adjusting device further includes at least one limit stop provided at the at least one compensation element, wherein the at least one limit stop limits admissible relative movement. The at least one compensation element may include a stiffness that is progressive in a direction of compression. The adjusting device may further include a damping element structured and arranged to dampen vibrations of the at least one compensation element.

The adjusting device may further include at least one sensor element provided in a drive link including the drive strut of the at least one second drive, wherein the at least one sensor element detects relative movements. The at least one sensor element may detect inadmissibly large relative movements. The at least one sensor element may be arranged in parallel with the at least one compensation element.

In accordance with additional aspects of the invention, there is a method of adjusting a flap at a wing of an aircraft. The method includes driving and guiding movement of the flap relative to the wing in a wing chord direction using a plurality of drive stations. The method also includes compensating constraining forces occurring in the plurality of drive stations due to relative movements between the flap and the wing in the wing chord direction using at least one compensation element included in at least one of the drive stations.

BRIEF DESCRIPTION OF THE DRAWINGS

Embodiments of the invention are explained in detail on the basis of schematic drawings, wherein.

DETAILED DESCRIPTION OF THE INVENTION

Figure 1:
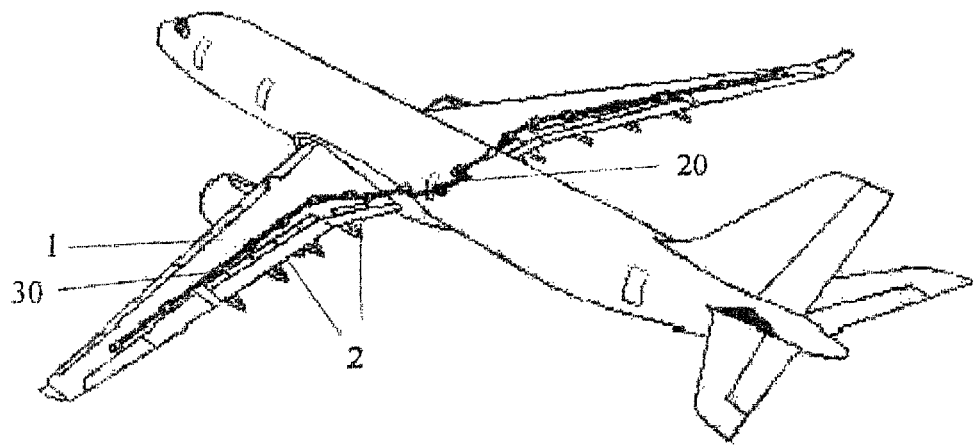
FIG. 1 shows a perspective general view of an aircraft with an adjusting device at the wing trailing edge driven by a central flap drive via a torsion shafting.
Figure 4:
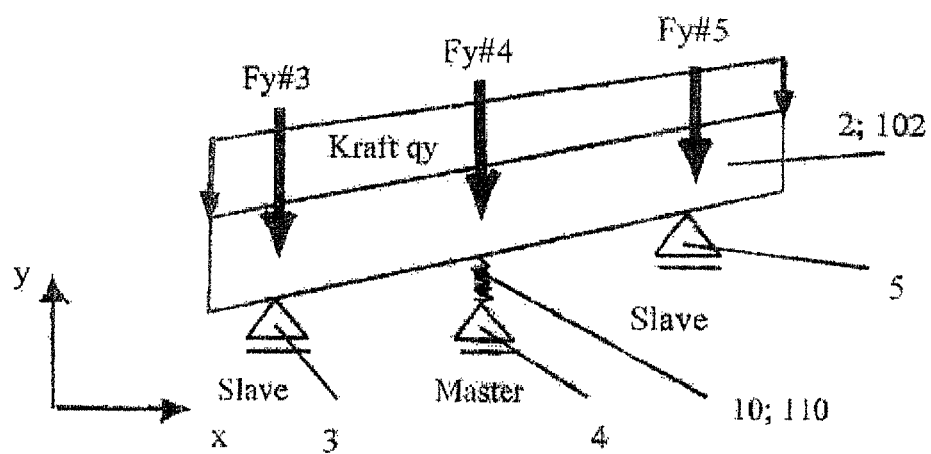
FIG. 4 shows a plan view of a flap of adjusting device according to embodiments of the invention for the purpose of explaining forces and relative movements occurring at the flap.

FIG. 1 shows a perspective view of a modern airliner or transport plane, which is provided with high-lift systems at its airfoil wing at the wing leading edge as well as at the wing trailing edge for increasing lift during takeoff and landing. Several high-lift flaps 2 are provided on each side at the trailing edge of the airfoil wing 1, which are coupled by a central flap drive 20 via a torsion shafting 30 comprising a number of torsion shafts. The flaps 2 are movably adjustably connected to the airfoil wing 1 at respective drive stations 3, 4, 5 which are schematically shown in FIG. 4, and are held in wing span direction as well as in wing chord direction.

Figure 2:
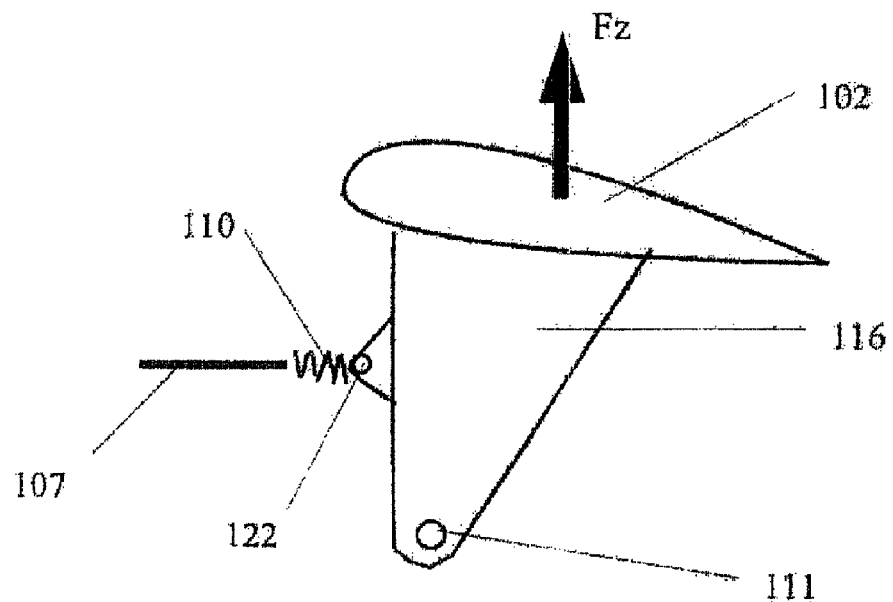
FIG. 2 shows a schematized cross-sectional view of adjusting device according to an embodiment of the invention.

FIG. 2 shows a schematized view showing a cross-sectional view through an adjusting device according to a first embodiment of the invention. A high-lift flap (landing flap) 102 is disposed at the rear edge of the airfoil wing 1 of an aircraft, which in the embodiment shown can be operated via so-called dropped-hinge kinematics. In such dropped-hinge kinematics or swivel flap arrangement, the high-lift flap 102 is swivelled at a flap lever 116 about a swivel point 111 provided under the wing. When being extended, the flap is swivelled about the swivel point 111 disposed under the wing on a track having the form of a circular arc. A joint 122 is provided at the flap lever 116, at which a tension/compression element 107 acts, which serves for operating the flap 102 in the sense of an extending or retracting movement on the above-mentioned circular track about the swivel point 111, such that a drive station is provided. Preferably, at least a second drive station is provided (which is not shown), such that the high-lift flap 102 is disposed at the wing to be swivelled by two drive stations. The tension/compression element 107 is coupled with the torsion shafting 30 shown in FIG. 1. A compensation element formed as an elastic element 110 is inserted in the drive link comprising the tension/compression element 107 between the torsion shafting 30 and the flap 102, which serves for compensation of relative movements in the wing chord direction between flap 102 and wing 1 and constraining forces caused thereby. In the embodiment shown in FIG. 2, the compensation element 110 is provided between the tension/compression element 107 and the joint 122 at the flap lever 116, or it forms part of the tension/compression element 107 and is formed by a spring or an elastomer element.

Figure 3:
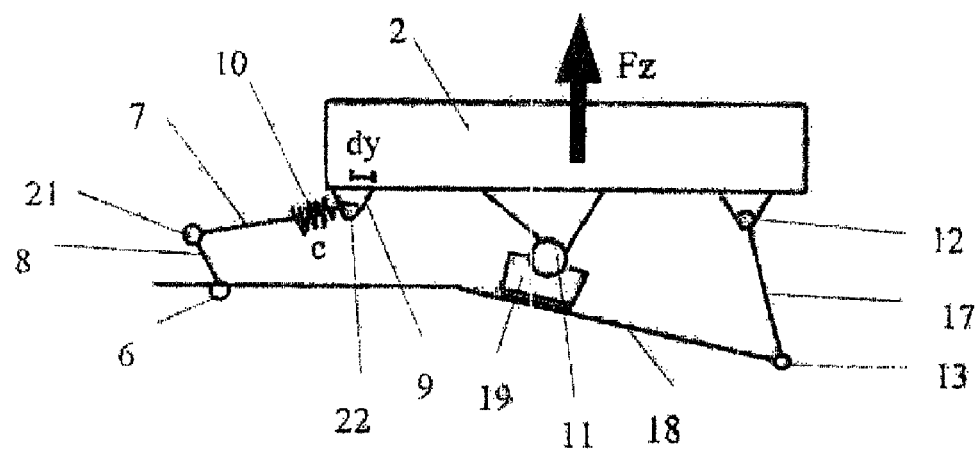
FIG. 3 shows a schematized cross-sectional view of an adjusting device according to a further embodiment of the invention.

FIG. 3 shows a schematized view showing a cross-sectional view of an adjusting device according to a second embodiment of the invention. At the rear edge of an airfoil wing 1 of an aircraft a high-lift flap (landing flap) 2 is disposed, which in the embodiment shown can be operated via a so-called track-rear-link arrangement. At the lower surface of the wing 1 a track 18 is provided, extending diagonally backwards and downwards, on which a carriage 19 is displaceably disposed substantially in an aircraft longitudinal direction and in a wing chord direction, respectively. The carriage 19 is coupled with the flap 2 via a first joint 11. Between a second joint 12 located further at the back at the flap 2 and a third joint 13 disposed at the rear end of the track 18 a lever (rear link) 17 is disposed, by which the rear part of the flap 2 is pulled downwards with an increasing extension movement, thereby positioning the flap 2. At a torsion shaft 6 comprised in the drive train (torsion shafting 30), a lever arm 8 or a lever arm element is provided, with which a load leading mounting 9 is coupled at or near the front end of the flap 2 via a tension/compression element (drive strut) 7. The load leading mounting 9 is non-detachably connected to the flap 2. A compensation element formed as an elastic element 10 is inserted in the drive link comprising the tension/compression element 7 between the torsion shaft 6 and the flap 2, which serves for compensation of relative movements in wing chord direction between the flap 2 and the wing 1 and constraining forces caused thereby.

In the embodiment shown in FIG. 3, the compensation element 10 is provided between the tension/compression element 7 and the load leading mounting 9 or forms part of the tension/compression element 7 and is formed by a spring or an elastomer element. In this embodiment, the high-lift flap 2 is preferably disposed at the wing to be swivelled by at least three drive stations.

The type of flap kinematics is not essential for the present invention; other types of flap kinematics than the kinematics shown in FIG. 2 or 3 might be used as well.

Relative movements between the flap 2; 102 and the drive link comprising the tension/compression element 7; 107 and constraining forces caused thereby due to reciprocal movements between the flap 2; 102 and the airfoil wing 1, for example by bending, torsion or vibration of wing 1, are compensated by the compensation element 10; 110. In particular, a coupling effect is avoided between the flap normal force Fz and the tension/compression element 7; 107 and the torsion shafting 30, respectively. The forces transmitted via the tension/compression element 7; 107 now are coupled with the relative displacement "dy" between flap 2; 102 and wing 1 via the spring stiffness of the compensation element 10; 110. By a suitable choice of the spring stiffness and possibly also non-linear stiffness developments, a consistent load of the tension/compression elements 7; 107 can be achieved.

FIG. 4 shows a plan view of the flap 2; 102, of FIG. 2 and FIG. 3, respectively. The flap 2; 102 is held at first drive stations 3, 5 in a defined position with regard to the wing chord direction, and released for compensation of relative movements between flap 2; 102 and wing 1 with regard to wing span direction. The flap 2; 102 is held in a defined position with regard to the wing span direction at a second drive station 4 and released for compensation of said relative movements between flap 2; 102 and wing 1 with regard to the wing chord direction. The compensation element 10 or 110 is provided in this second drive station 4, which is inserted in the drive link comprising the tension/compression element 7; 107 for compensation of the relative movements in the wing chord direction. This is shown in FIG. 4 in a schematized manner. The forces acting at the first drive stations 3, 5 (slave stations) and the second drive station 4 (master station) in the direction of the wing chord are designated by Fy #3, Fy #4, and Fy #5.

The compensation element 10; 110 is preferably provided with a limit stop limiting the relative movement, such that it is limited when a determined relative movement is exceeded. In addition, the compensation element 10; 110 may comprise a progressive stiffness in the compression area. Thereby, the functioning in cases of failure can be assured as well.

In addition, a damping element for damping vibrations of the compensation element 10; 110 may be provided, which may be arranged within the drive link comprising the tension/compression element 7; 107 parallel to the compensation element 10; 110 or between the flap 2; 102 and the wing 1. Instead of a damping by an additional specially designed damping element, a compensation element 10; 110 having an intrinsic damping characteristic may also be provided.

In order to detect inadmissibly large relative movements in the drive link comprising the tension/compression element 7; 107 and/or between the flap 2; 102 and the wing 1, also a sensor element may be provided, which signals cases of failure, such as the breakdown of the drive at a drive station. This sensor element may be connected in parallel to the compensation element 10; 110.

Instead of the arrangement of the compensation element 10; 110 in or at the tension/compression element 7; 107 as shown in FIGS. 2 and 3, the compensation element 10; 110 may also be provided in the lever arm element 8 of FIG. 3 or it may be formed by the same. Furthermore, the compensation element 10 may be assembled between the torsion shaft 6 and the lever arm 8. The compensation element 10; 110 may be linear-elastic, i.e., it may respond to compression or tension, or it may be torsion elastic, depending on whether it is arranged on the side of the torsion shaft as the torsion shaft 6 of FIG. 3, or on the side of the tension/compression element 7; 107 with regard to the link connection between these two parts.

Advantages of the adjusting device and the airfoil wing provided with the same according to the invention are a minor complexity and weight of the system, lower costs for manufacturing and mounting, and a larger available space in the area of the drive stations. Further advantages are less force coupling between the flap and its drive and less loads in the flap drive in the case of jamming or other malfunctions.

REFERENCE NUMBERS 1 airfoil wing
2; 102 high-lift flap
3 drive station
4 drive station
5 drive station
6 torsion shaft
7; 107 tension/compression element (drive strut)
8 lever arm
9 load leading mounting
10; 110 compensation element
11; 111 first joint
12 second joint
13 third joint
116 flap lever
17 lever (rear link)
18 track
19 carriage
20 flap drive
21 joint
22; 122 joint
30 torsion shafting

The invention claimed is:

1. An adjusting device for adjusting a flap at a wing of an aircraft, comprising:
at least one flap drive for operating the flap; and
a plurality of drive stations comprising drive struts structured and arranged to movably connect the flap to the wing,
wherein the plurality of drive stations comprises at least two first drive stations that guide the flap in a defined position in a wing chord direction,
the plurality of drive stations comprises at least one second drive station at which the flap is moveable in the wing chord direction,
the at least one second drive station comprises at least one compensation element structured and arranged to compensate constraining forces occurring in the plurality of drive stations due to relative movements between the flap and the wing in the wing chord direction.

2. The adjusting device according to claim 1, wherein the at least one compensation element is arranged in the drive strut of the at least one second drive station between the flap and a torsion shaft connected to the flap drive.

3. The adjusting device according to claim 1, wherein the at least one compensation element is elastic at least in sections.

4. The adjusting device according to claim 1, wherein:
the flap is a high-lift flap, and
the at least two first drive stations hold the flap in a defined position in the wing chord direction via dropped-hinged kinematics.

5. The adjusting device according to claim 1, wherein:
the flap is a high-lift flap,
the wing is an airfoil wing, and
the flap is connected to the wing by a track-rear link arrangement.

6. The adjusting device according to claim 1, wherein the at least one compensation element is provided at or formed by the drive strut of the at least one second drive station.

7. The adjusting device according to claim 1, wherein the at least one compensation element is provided between the flap and the drive strut of the at least one second drive station.

8. The adjusting device according to claim 1, wherein:
the at least one compensation element is provided between the drive strut of the at least one second drive station and a lever arm operatively connected to the drive strut, and
the lever arm and the drive strut are comprised in a drive link.

9. The adjusting device according to claim 1, wherein:
a drive link comprises the drive strut of the at least one second drive station and a lever arm operatively connected to the drive strut, and
the at least one compensation element is provided at or formed by the lever arm.

10. The adjusting device according to claim 1, wherein:
a drive link comprises the drive strut of the at least one second drive station and a lever arm operatively connected to the drive strut, and
the at least one compensation element is provided between the lever arm and a torsion shaft of the flap drive.

11. The adjusting device according to claim 1, wherein the at least one compensation element is linearly elastic.

12. The adjusting device according to claim 1, wherein the at least one compensation element is torsion elastic.

13. The adjusting device according to claim 1, wherein the at least one compensation element comprises at least one spring.

14. The adjusting device according to claim 1, wherein the at least one compensation element comprises at least one elastomer element.

15. The adjusting device according to claim 1, further comprising at least one limit stop provided at the at least one compensation element, wherein the at least one limit stop limits admissible relative movement.

16. The adjusting device according to claim 1, wherein the at least one compensation element comprises a stiffness that is progressive in a direction of compression.

17. The adjusting device according to claim 1, further comprising a damping element structured and arranged to dampen vibrations of the at least one compensation element.

18. The adjusting device according to claim 1, further comprising at least one sensor element provided in a drive link comprising the drive strut of the at least one second drive, wherein the at least one sensor element detects relative movements.

19. The adjusting device according to claim 18, wherein the at least one sensor element detects inadmissibly large relative movements.

20. The adjusting device according to claim 18, wherein the at least one sensor element is arranged in parallel with the at least one compensation element.

21. A method of adjusting a flap at a wing of an aircraft, comprising:
driving and guiding movement of the flap relative to the wing in a wing chord direction using a plurality of drive stations; and
compensating constraining forces occurring in the plurality of drive stations due to relative movements between the flap and the wing in the wing chord direction using at least one compensation element comprised in at least one of the drive stations.

* * * * *